Sept. 10, 1968

C. HOROWITZ 3,401,049

METHOD OF GRAFTING POLYMERIZABLE MONOMER ONTO SUBSTRATES
AND RESULTANT ARTICLE

Filed May 25, 1964

INVENTOR.
CARL HOROWITZ

BY

*Percy Freeman*
ATTORNEY

United States Patent Office 3,401,049
Patented Sept. 10, 1968

3,401,049
METHOD OF GRAFTING POLYMERIZABLE MONOMER ONTO SUBSTRATES AND RESULTANT ARTICLE
Carl Horowitz, Brooklyn, N.Y., assignor to Polymer Research Corp. of America, Brooklyn, N.Y., a corporation of New York
Filed May 25, 1964, Ser. No. 370,096
6 Claims. (Cl. 117—47)

ABSTRACT OF THE DISCLOSURE

This invention provides a method whereby a polymer is grafted to an underlying non-metallic substrate, such as cellophane, fabrics, etc. by distributing bodies of silver or silver oxide in situ onto the surface of the substrate in such manner that the bodies are bonded to the surface, and then polymerizing a material to the substrate, the material being polymerized being of a composition such that the polymerization thereof is activated to polymerization by the silver or silver oxide particles in the surface of the substrate.

---

Figure 1:
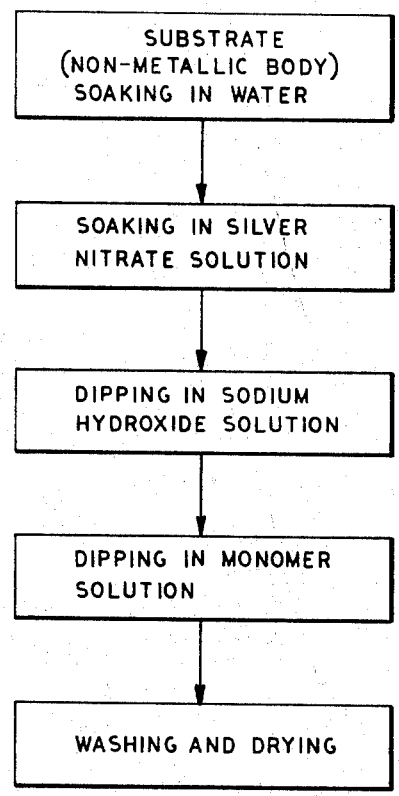

The present invention relates to the intimate bonding of polymeric materials to various objects, to the method for accomplishing the same, and to the objects produced thereby. In accordance with the present invention, the polymeric materials are bonded extremely intimately to the underlying material which, as will be described below, can be of various different types, and for the purposes of this disclosure, this intimate bonding will hereinafter be referred to as "grafting."

It is a primary object of the present invention to provide a method of grafting various different types of synthetic polymers to base materials of various different type including synthetic and natural materials.

It is another object of the present invention to provide products resulting from the grafting of the polymers onto the base materials, which products have improved properties as compared to the original base materials.

It is yet another object of the present invention to provide a general method of grafting synthetic polymers onto base materials of any type and any shape.

Other objects and advantages of the present invention will be apparent from a further reading of the specification and of the appended claims.

With the above and other objects in view, the present invention mainly comprises the dispersion and distribution of bodies of silver oxide or colloidal silver in situ throughout at least the surface layer of a non-metallic object, and contacting the thus formed object with a polymerizable composition adapted to be activated to polymerization by silver oxide or metallic silver so as to cause polymerization at the site of the silver oxide or metallic silver bodies, whereby the resulting polymer is bonded directly to said body to form an intimate bonding of said polymer onto said body.

The dispersion and distribution of the bodies of silver oxide or metallic silver in at least the surface layer of the non-metallic object may be accomplished by either immersing the non-metallic object in a reaction mixture obtained by the addition of an alkali metal hydroxide to an aqueous silver nitrate solution, the alkali metal hydroxide being added in an amount just sufficient to achieve a permanent slight cloudiness, or it may be accomplished by first immersing the non-metallic object in an aqueous silver nitrate solution and then in a solution of an alkali metal hydroxide.

These methods result in the deposition of silver oxide or metallic silver bodies in at least the surface layer of the non-metallic object.

The resulting object having bodies of silver oxide or metallic silver formed in situ throughout at least the surface layer thereof is then contacted with a polymerizable composition which is or becomes polymerizable in contact with metallic silver or silver oxide, possibly by the addition also of some heat, whereby the polymerization of the polymerizable composition occurs at the sites of the silver oxide or metallic silver bodies so that the resulting polymer which is formed and attached to the non-metallic object is intimately bonded to the non-metallic object and can hardly be removed therefrom.

The polymerizable composition which is adapted to be activated to polymerization by silver oxide or metallic silver generally comprises a polymerizable monomer and a peroxide type polymerization catalyst, the combination of the monomer and the catalyst preferably being dissolved in a suitable solvent therefor.

FIG. 1 is a flow sheet illustrating the method of the invention; and

Figure 2:
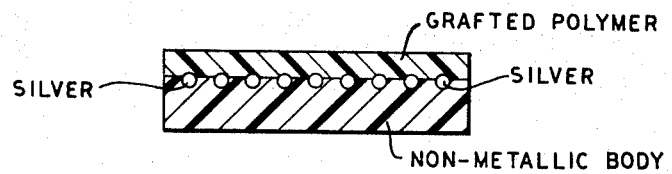

FIG. 2 diagrammatically illustrates the product produced by the invention.

Although the present invention is not meant to be limited to any specific theory as to how or why the action which occurs does take place, the following theory is given in the hope that it will help others to carry out further research in this field.

It is believed that the peroxide type catalyst which is used in the monomer-catalyst composition is broken into active radicals by the action of the metallic silver or silver oxide. These radicals in turn initiate the polymerization of the monomer. Since the metallic silver and/or silver oxide bodies are present directly on the molecules of the fibers and/or films of the underlying non-metallic body, this resulting from the deposition within and without the fibers and films of the silver oxide or colloidal silver metal by the method described above, much in the same way that dispersed dyes are dissolved in synthetic fabrics, the polymerization takes place directly on the molecules of the fibers and/or films with very little or no homopolymerization in the solution. This results in complete utilization of the monomer for the grafting of the polymer resulting therefrom onto the underlying body, as well as resulting in the strong intimate bonding of the polymer to the underlying body.

A further advantage of the present invention is that the presence of the silver oxide throughout the surface layer of the underlying base material renders the same bactericidal. This bactericidal property remains substantially permanently so that, for example, if the underlying body is a bristle of a brush such as a toothbrush, the same is not only grafted but is also bactericidal.

Among the materials that can be used for the non-metallic base object are: cellophane, cotton fibers and fabrics, rayon fibers and fabrics, wood, nylon fibers, fabrics and films, Dacron (which is a polyester) fibers and fabrics, polyester fibers, fabrics, and films, Mylar (which is polyethylene glycol adipate) films, Arnel (which is cellulose triacetate) fibers, fabrics and films, polyethylene fibers and fabrics, natural and synthetic rubbers, leather, wool, hair, and even human skin, as will be described below.

The invention is applicable to the use of any polymerizable monomers, such as: vinylidene chloride, chloroprene, isoprene, dimethylaminoethyl methacrylate, styrene, 1,3-butylene dimethacrylate, hydroxyethyl methacrylate, isooctylvinyl ether, acrylonitrile, acrylamide, N-vinyl pyridine, glycidyl methacrylate, N-vinyl caprolactam, N-vinyl pyrrolidone, N-vinyl carbazole, acrylic acid, methacrylic acid, ethyl acrylate, ethyl methacrylate, itaconic acid, isobutylmethacrylate, methyl acrylate, sodium styrene sulfonate, sodium vinyl sulfonate, bis (beta-chloroethyl) vinyl phosphate, cetyl vinyl ether, divinylether of ethylene glycol, divinyl ether of butanediol, vinyl toluene, vinyl acetate, octadecyl vinylether. Also mixtures of 2 or more monomers can be used. The monomeric tertiary amines can be quaternized with benzyl chloride, ethyl iodide, methyl or ethylsulfate. Conversely, monomeric chlorides can be quaternized with tertiary amines to give quaternary ammonium compounds. Some suitable tertiary amines are: N-ethyl morpholine, pyridine, cetyldimethyl pyridine.

The monomers can be copolymerized with cross-linking agents such as butadiene, divinylbenzene or maleic anhydride.

The monomer can be dissolved in a suitable solvent such as dimethylformamide, tetrahydrofurane, tetrahydrofurfuryl alcohol, dimethylsulfoxide, water, methyl, ethyl or isopropyl alcohol, acetone, methyl ethyl ketone and ethyl acetate. Also mixtures of two or more of the above can be used.

Among the catalysts which can be used are: ammonium persulfate, hydrogen peroxide, tert-butylhydroperoxide, ditert-butyl peroxide, benzoyl peroxide, dicumyl peroxide, lauroyl peroxide, tert-butyl perbenzoate and peracetic acid.

The uses for the above grafted materials are diversified and can be for water purification based on the electrodialysis principle utilizing positively charged membrane e.g. cellophane grafted with quaternized dimethylaminoethyl methacrylate and negatively charged membrane e.g. cellophane grafted with sodium styrene sulfonate. Or they can be used for elimination of static electricity from synthetic fabric such as nylon or polyethylene by grafting chloroprene and quaternizing it with N-ethyl morpholine and cetyl dimethyl amine. Chloroprene can be grafted on nylon or rayon, etc., to give an increased adhesion to rubber in nylon rubber tires.

Neoprene can be grafted on leather to give it water repellency without closing up pores and permitting vapors to pass through but not water.

A combination of two or more monomers mentioned above can be grafted to obtain graft copolymers.

The concentration of the silver nitrate in the initial silver nitrate solution can vary within wide ranges, though it is preferably between about 0.01% to 1% and most preferably between 0.05% to 0.1%.

The alkali metal hydroxide is most preferable, from the point of view of economy and ready availability, sodium hydroxide, though other alkali metal hydroxides such as potassium hydroxide and lithium hydroxide can be used with equal facility. The concentration of the alkali metal hydroxide in the aqueous solution thereof, if an aqueous solution is used, can be within any range, though for practical convenience the range is generally between about 0.5% and 5% by weight.

The concentration of the monomer in the solution can likewise vary within practically any limits, for example between about 0.1% and 50%, though the preferred concentration for facility of use is between about 5% and 15% by weight.

The following examples are given to further illustrate the present invention. The scope of the invention is not, however, meant to be limited to the specific details of the examples:

Example 1

The cellophane 150–PD obtained from Du Pont de Nemours is treated in the following solutions.

Solution A:
   Plain water
   At room temperature for ½ minute
Solution B:
   2 g. silver nitrate
   2000 cc. demineralized water
   At room temperature for ½ minute
Solution C:
   40 g. sodium hydroxide pellets
   4000 cc. water
   4 g. Triton X–100 wetting agent manufactured by Rohm & Haas Co.
   At 65° C. for ½ minute.
Solution D:
   3200 g. dimethylformamide
   1000 cc. water
   75 g. ammonium persulfate
   200 g. vinylidene chloride monomer
   At room temperature overnight The cellophane is then washed in warm cyclohexanone at approximately 60° C. and air dried. The resulting film shows presence of vinylidene chloride by increase in weight and using the Beilstein test. The weight increase is 60% and there is no significant loss in weight even after boiling for one hour in cyclohexanone. Therefore, it is concluded that vinylidene chloride which is now in polymer form is attached chemically to the cellulose molecule of cellophane. The grafted film is transparent and clear and shows 60% increase in thickness.

When placed on inoculated agar on Petri dishes and incubated for 24 hours it showed a 3 mm. zone of inhibition against *Staphylococcus aureus* and a 2 mm. zone against *Escherichia coli*. Afterwards the film was placed for 24 hours under running water. At the end of this time it was again tested bacteriologically. There was no change in bactericidal properties.

Example 2

Same as Example 1 except that a piece of cotton fabric was used instead.

Similar permanent increase in weight and permanent bactericidal results were obtained.

Example 3

Same as Example 1 except that nylon fabric was used. The permanent increase in weight was 20%.

Example 4

Cellophane PUT–76 obtained from Olin Mathieson Corporation was treated in the following solutions:

Solution A:
   Plain water
   At room temperature for ½ minute
Solution B:
   2 g. silver nitrate
   2000 cc. demineralized water
   At room temperature for ½ minute
Solution C:
   40 g. sodium hydroxide pellets
   4000 cc. water
   4 g. Triton X–100 wetting agent
   At room temperature for ½ minute
Solution D:
   20 g. isoprene monomer manufactured by Enjay Chemical Company
   150 g. methyl alcohol
   55 cc. of water
   2 g. ammonium persulfate
   Overnight at room temperature in a closed container The weight and thickness increased 60%. The grafted cellophane which was clear and transparent, showed permanent bactericidal properties, the same as in Example 1.

Example 5

The following solutions are prepared:

Solution #1:
   Plain water
   At room temperature
Solution #2:
   2000 cc. demineralized water
   1 g. silver nitrate
   At room temperature Solution #3:
  2000 cc. water
  20 g. sodium hydroxide pellets
  2 g. Triton X-100 (mfg. by Rohm and Haas, Phila.)
  At 70° C.
Solution #4:
  640 g. dimethylformamide
  40 g. freshly distilled chloroprene
  150 cc. water
  15 g. ammonium persulfate
  At 20° C.

There is immersed in these solutions a sample of each of the folowing:

(1) cellophane
(2) cotton fabric
(3) rayon fabric
(4) nylon fabric
(5) Dacron fabric
(6) natural gum rubber sheet .036″ thick
(7) natural rubber latex film .006″ thick
(8) leather The samples were soaked for one minute in Solution #1, one minute in Solution #2, one minute in Solution #3, and left overnight in Solution #4.

The samples were then washed with dimethylformamide and dried.

They all showed presence of large amount of neoprene graft which could not be washed out with solvents.

The graft on natural gum rubber sheet was on surface only. The graft on cellophane, leather and rubber latex film was throughout the body of the material.

Example 6

Sheets of cellophane 150-PD (Du Pont) are dipped in the following solutions:

Solution A:
  Plain water
  At room temperature
Solution B:
  2000 cc. demineralized water
  1 g. silver nitrate
  At room temperature
Solution C:
  2000 cc. water
  20 g. sodium hydroxide pellets
  2 g. Triton X-100 (Rohm and Haas)
  At 70° C.
Solution D:
  270 g. dimethylaminoethylmethacrylate (Rohn and Haas)
  600 g. dimethylformamide (Du Pont)
  130 g. glacial acetic acid
  150 g. benzylchloride
  450 cc. water
  6 g. tert-butyl hydroperoxide (Wallace and Tiernan) dissolved in 20 g. dimethylformamide
  At 75-80° C.

Sheets of cellophane were immersed in plain water (Solution A) for 1 minute, in Solution B for 1 minute, in Solution C for 1 minute, and in Solution D for 30 minutes, washed with water then with a 10% aqueous solution of glycerine and dried.

Example 7

Sheets of cellophane 150-PD (Du Pont) are dipped in the following solutions:

Solution A:
  Plain water
  At room temperature
Solution B:
  2000 cc. demineralized water
  1 g. silver nitrate
  At room temperature
Solution C:
  2000 cc. water
  20 g. sodium hydroxide pellets
  2 g. Triton X-100 (Rohm and Haas)
  At 70° C.
Solution D:
  400 g. sodium styrene sulfonate (Du Pont)
  1200 cc. water
  2000 g. dimethylformamide (Du Pont)
  30 g. glacial acetic acid
  200 g. glycidylmethacrylate (American Aniline Corp.)
  14.4 g. ammonium persulfate
  At 75-80° C.

Sheets of cellophane were immersed in plain water (Solution A) for 1 minute, in Solution B for 1 minute, in Solution C for 1 minute and in Solution D for 30 minutes, washed with water and dried.

Example 8

Grafting on live human skin can be performed using the above principle. First a 0.1% solution of silver nitrate is painted on an area of the skin, dried in air and exposed to daylight for a few hours until it turns brown. Next a solution of monomers and catalyst is prepared:

100 g. sodium styrene sulfonate
300 cc. water heated on waterbath until completely dissolved.

To the above is added:

100 g. hydroxyethylmethacrylate
20 cc. glacial acetic acid: the solution is heated to 50° C. and
10 g. of ammonium persulfate dissolved in 50 cc. of water is added.

The portion of human skin treated as above is immersed in the monomer solution in a shallow glass tray and maintained there for 30 minutes. It is washed, dried and covered with vaseline or cold cream. The color of the skin is now normal flesh color again due to the reaction of silver with the catalyst and the monomer is polymerized to the skin. The above treatment will change the structure of proteins of the skin due to attachment of polymers and should make it valuable in treatment of skin diseases, because the changed grafted skin will present an unsuitable milieu to the host. Alternately, medications, vitamins or hormones can be attached to the polymer so as to remove wrinkles on the skin and to rejuvenate the facial tissue.

Example 9

A 1% aqueous solution of sodium hydroxide is added to 1000 cc. of demineralized water containing 1 g. of silver nitrate, heated to 95° C., in an amount sufficient to result in a permanent slight cloudiness (about 3 cc.). A nylon sheet is immersed in the resulting reaction mixture at 95° C. for 30 minutes. The resulting sheet is then immersed in a solution of 10 g. of hydroxyethylmethacrylate in 1000 cc. of water containing 5 g. of ammonium persulfate dissolved in 30 cc. of water. The nylon sheet is maintained in the solution overnight, or in order to speed up the reaction the solution with the samples inside can be heated on a water bath at 50-70° C. for 15 minutes.

The resulting sheet is not discolored but is permanently bactericidal.

During this process a polymerization takes place with silver oxide forming radicals in the presence of the ammonium persulfate. The radicals initiate polymerization and grafting of the hydroxyethylmethacrylate which attaches itself to the polymer giving a permanently bactericidal but not discolored object.

Although the present invention has been described in some detail by way of illustration and example for purposes of clarity of understanding, it is understood that certain changes and modifications may be made within the spirit of the invention and scope of the appended claims.

Having thus described my invention, what I claim as new and desire to be secured by Letters Patent is:

1. The method which comprises contacting a non-metallic body with a solution of silver nitrate and with an alkali metal hydroxide which precipitates from said solution a substance selected from the group consisting of silver oxide and colloidal silver so as to disperse and bond bodies of said substance in situ throughout at least the surface layer of said non-metallic object, said non-metallic object being selected from the group consisting of cellophane, cotton, rayon, wood, nylon, polyester, polyethylene glycol adipate, cellulose triacetate, polyethylene, natural and synthetic rubbers, leather, wool, hair and skin, and contacting the thus formed object with a polymerizable composition including a catalyst and being adapted to be activated to polymerization by said substance, so as to cause polymerization at the site of said bodies of said substance, whereby the resulting polymer is bound directly to said non-metallic object at said bodies of said substance, thereby forming an intimate bonding of said polymer onto said object.

2. The method which comprises contacting a non-metallic body with a solution of silver nitrate and with an alkali metal hydroxide which precipitates from said solution a substance selected from the group consisting of silver oxide and colloidal silver so as to disperse and bond bodies of said substance in situ throughout at least the surface layer of said non-metallic object said non-metallic object being selected from the group consisting of cellophane, cotton, rayon, wood, nylon, polyester, polyethylene glycol adipate, cellulose triacetate, polyethylene, natural and synthetic rubbers, leather, wool, hair and skin, and contacting the thus formed object with a solution comprising a polymerizable monomer adapted to be activated by an activated peroxide catalyst, and a peroxide catalyst which is activated upon contact with a substance selected from the group consisting of silver oxide and metallic silver, so as to cause polymerization at the site of said bodies of said substance, whereby the resulting polymer is bound directly to said non-metallic object at said bodies of substance, thereby forming an intimate bonding of said polymer onto said object.

3. Method according to claim 2, in which said polymerizable monomer is selected from the group consisting of vinylidene chloride, chloroprene, isoprene, dimethylaminoethyl methacrylate, styrene, 1,3-butylene dimethacrylate, hydroxyethyl methacrylate, isooctylvinyl ether, acrylonitrile, acrylamide, N-vinyl pyridine, glycidyl methacrylate, N-vinyl caprolactam, N-vinyl pyrrolidone, N-vinyl carbazole, acrylic acid, methacrylic acid, ethyl acrylate, ethyl methacrylate, itaconic acid, isobutylmethacrylate, methyl acrylate, sodium styrene sulfonate, sodium vinyl sulfonate, bis (beta-chloro-ethyl) vinyl phosphate, cetyl vinyl ether, divinylether of ethylene glycol, divinyl ether of butanediol, vinyl toluene, vinyl acetate, and octadecyl vinylether.

4. Method according to claim 3 in which said catalyst is selected from the group consisting of ammonium persulfate, hydrogen peroxide, tertbutylhydroperoxide, ditertbutyl peroxide, benzoyl peroxide, dicumyl peroxide, lauroyl peroxide, tert-butylperbenzoate and peracetic acid.

5. Product produced by the method of claim 1.
6. Product produced by the method of claim 3.

References Cited

UNITED STATES PATENTS

| | | | |
|---|---|---|---|
| 2,764,504 | 9/1956 | Jacobson et al. | 117—56 |
| 3,083,118 | 3/1963 | Bridgeford | 117—47 |
| 3,088,791 | 5/1963 | Cline et al. | 117—47 |

MURRAY KATZ, *Primary Examiner.*